(12) United States Patent
Hwang

(10) Patent No.: US 7,722,225 B2
(45) Date of Patent: May 25, 2010

(54) BACKLIGHT UNIT AND METHOD OF MANUFACTURING A DIFFUSER EMPLOYED IN THE SAME

(75) Inventor: Kab Jin Hwang, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/509,045

(22) Filed: Aug. 24, 2006

(65) Prior Publication Data

US 2007/0097695 A1 May 3, 2007

(30) Foreign Application Priority Data

Oct. 27, 2005 (KR) .................. 10-2005-0101867

(51) Int. Cl.
*F21V 5/00* (2006.01)
*G09F 13/04* (2006.01)
*B29D 11/00* (2006.01)

(52) U.S. Cl. .................. 362/331; 362/97.1; 264/1.7

(58) Field of Classification Search .................. 362/331, 362/311, 246, 355, 330, 606, 97.1; 359/599; 349/64, 112; 264/1.1, 1.7; 428/1.3, 323, 428/327

See application file for complete search history.

(56) References Cited

U.S. PATENT DOCUMENTS

| | | | | |
|---|---|---|---|---|
| 5,900,309 A | * | 5/1999 | Kitamura et al. | 428/212 |
| 6,480,249 B2 | * | 11/2002 | Iwata et al. | 349/112 |
| 6,596,375 B2 | * | 7/2003 | Murata et al. | 428/144 |
| 6,771,335 B2 | | 8/2004 | Kimura et al. | |
| 6,841,237 B2 | * | 1/2005 | Murata et al. | 428/323 |
| 6,936,313 B2 | * | 8/2005 | Sakata et al. | 428/1.53 |
| 2002/0005924 A1 | * | 1/2002 | Kimura | 349/112 |
| 2002/0068134 A1 | * | 6/2002 | Yagi et al. | 428/1.1 |
| 2002/0102367 A1 | * | 8/2002 | Shimodaira et al. | 428/1.6 |
| 2002/0114169 A1 | * | 8/2002 | Harada et al. | 362/558 |
| 2002/0172810 A1 | * | 11/2002 | Murata et al. | 428/204 |
| 2004/0240070 A1 | * | 12/2004 | Suzuki et al. | 359/599 |

FOREIGN PATENT DOCUMENTS

JP 2000-275742 A 10/2000

\* cited by examiner

*Primary Examiner*—Jong-Suk (James) Lee
*Assistant Examiner*—David R Crowe
(74) *Attorney, Agent, or Firm*—Birch, Stewart, Kolasch & Birch, LLP

(57) ABSTRACT

A diffuser for a backlight unit of a display device including a base film, a first diffusion layer including a first resin and a plurality of first diffusion particles, and being formed on an upper surface of the base film, and a second diffusion layer including a second resin and a plurality of second diffusion particles, and being formed on a lower surface of the base film. Further, the plurality of first diffusion particles are contained within the first resin such that an upper surface of the first diffusion layer is substantially flat.

14 Claims, 6 Drawing Sheets

BACKLIGHT UNIT AND METHOD OF MANUFACTURING A DIFFUSER EMPLOYED IN THE SAME

This application claims priority to Korean Application No. 10-2005-0101867 filed in Korea on Oct. 27, 2005, the entire contents of which is hereby incorporated by reference in its entirety.

BACKGROUND OF THE INVENTION

1. Field of the Invention

The present invention relates to a backlight unit and a method of manufacturing a diffuser used in the backlight unit. More particularly, the present invention relates to a backlight unit for enhancing the diffusion characteristics of a diffuser included in the backlight unit and a method of manufacturing the diffuser.

2. Description of the Related Art

An organic electroluminescent device is self light emitting device that emits light having a certain wavelength. Further, a liquid crystal display (LCD) displays an image using a change in a transmissivity of liquid crystals included in the LCD. Also, because the LCD is not a self light-emitting device, the LCD includes a backlight unit (BLU).

In more detail, FIG. 1 is a sectional view illustrating a BLU 100 included in the LCD, and FIG. 2 is a sectional view illustrating a diffuser used in the BLU 100 in FIG. 1. As shown in FIG. 1, the BLU 100 is driven by a direct-lighting method and includes a light source unit 110, a transparent plate 120 and an optical film 140. Further, the light source unit 110 includes a plurality of light sources 112 for emitting light having a certain wavelength and a light source reflector 114 in which the light sources 112 are located.

In addition, the transparent plate 120 has a predetermined pattern, and is generally made of poly methyl meta acrylate (PMMA). The function of the transparent plate 120 is as follows. When the direct-lighting type BLU 100 does not include the transparent plate 120, a viewing user may actually see white lines in the display caused by the shape of the light sources 112 (hereinafter, referred to as disposition shape of the light sources). Accordingly, the BLU 100 uses the transparent plate 120 so the user does not see the disposition shape of the light sources 112.

In addition, as shown in FIG. 1, the optical film 140 includes a diffuser 142, a prism sheet 144, a protection sheet 146 and a reflective polarization film 148. Further, light transmitted from the transparent plate 120 is incident on the diffuser 142. The diffuser 142 diffuses or condenses the light transmitted from the transparent plate 120 so as to maintain a constant brightness of the BLU 100 and increase the viewing angle of the LCD.

Also, as shown in FIG. 2, the diffuser 142 includes a base film 150, a first diffusion layer 160 and a second diffusion layer 170. The first diffusion layer 160 is formed by coating a first resin 164 having first beads 162 on the upper surface of the base film 150. In addition, the second diffusion layer 170 is formed by coating a second resin 174 having second beads 172 on the lower surface of the base film 150. As shown in FIG. 2, a portion of each of the first and second beads 162 and 172 projects outside of the first and second resins 164 and 174. Thus, the light incident to the diffuser 142 is refracted by the beads 162 and 172, and then is transmitted in a direction of the prism sheet 144.

Referring back to FIG. 1, the prism sheet 144 condenses a light diffused or condensed by the diffuser 142 in a direction of the protection sheet 146, thereby enhancing the brightness of the BLU 100. Further, the protection sheet 146 is located over the prism sheet 144 to protect the prism sheet 144 from dust, etc., and to increase the viewing angle of the LCD narrowed by the prism sheet 144.

Also, only some light provided from the BLU 100 is transmitted through the panel (not shown). For example, a specific polarized light, e.g., a P wave of the light provided from the BLU 100 is transmitted through the panel, and the other polarized light, e.g., an S wave of the light is absorbed by the panel. Accordingly, the reflective polarization film 148 is employed in the BLU 100 so as to use the other polarized light absorbed by the panel.

In addition, the reflective polarization film 148 reflects the other polarized light diffused by the protection sheet 146 in the direction of the light source unit 110, and provides the specific polarized light to the panel. Further, the other polarized light reflected by the reflective polarization film 148 is again reflected by the light source reflector 114. As a result, the reflected other polarized light is changed into light including a specific polarized light and the other polarized light. The changed light is again incident to the reflective polarization film 148 through the diffuser 142, the prism sheet 144 and the protection sheet 146.

Thus, the BLU 100 enhances the efficiency of the light using the above described method. That is, the BLU 100 diffuses the light emitted from the light sources 112 using the transparent plate 120 and the diffuser 142 so that the user does not see the disposition shape of the light sources 112. However, the diffuser 142 does not sufficiently or uniformly diffuse the light emitted from the light sources 112. Accordingly, the user may still see the white lines in the display cause by the disposition shape of the light sources 112. In addition, the manufacture cost of the transparent plate is increased because the BLU 100 uses the transparent plate 120 having a predetermined pattern.

SUMMARY OF THE INVENTION

Accordingly, one object of the present invention is to address the above-noted and other problems.

Another object of the present invention is to provide a backlight unit using a diffuser and method of manufacturing the same that eliminates a user from seeing white lines in the display caused by a disposition shape of the light sources.

Yet another object of the present invention to provide a backlight unit that is less expensive to produce.

To achieve these and other objects, the present invention provides in one aspect, a diffuser for a backlight unit of a display device including a base film, a first diffusion layer including a first resin and a plurality of first diffusion particles, and being formed on an upper surface of the base film, and a second diffusion layer including a second resin and a plurality of second diffusion particles, and being formed on a lower surface of the base film. Further, the plurality of first diffusion particles are contained within the first resin such that an upper surface of the first diffusion layer is substantially flat.

According to another aspect, the present invention provides a method of manufacturing a diffuser for a backlight unit of a display device, which includes applying a first diffusion layer including a first resin and a plurality of first diffusion particles on an upper surface of the base film such that an upper surface of the first diffusion layer is substantially flat, and applying a second diffusion layer including a second resin and a plurality of second diffusion particles on a lower surface of the base film.

According to yet another aspect, the present invention provides a backlight unit for a display device, comprising: a light source configured to emit a light having a certain wavelength; a transparent plate disposed above the light source and configured to transmit the light emitted from the light source; and at least one diffuser configured to diffuse some of the light transmitted from the transparent plate, said at least one diffuser being disposed above the transparent plate and including a resin and a plurality of diffusion particles contained within the resin such that an upper surface of the diffuser is substantially flat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other features and advantages of the present invention will become readily apparent by reference to the following detailed description when considered in conjunction with the accompanying drawings, wherein.

DESCRIPTION OF THE INVENTION

Hereinafter, the preferred embodiments of the present invention will be explained in more detail with reference to the accompanying drawings.

Figure 3:
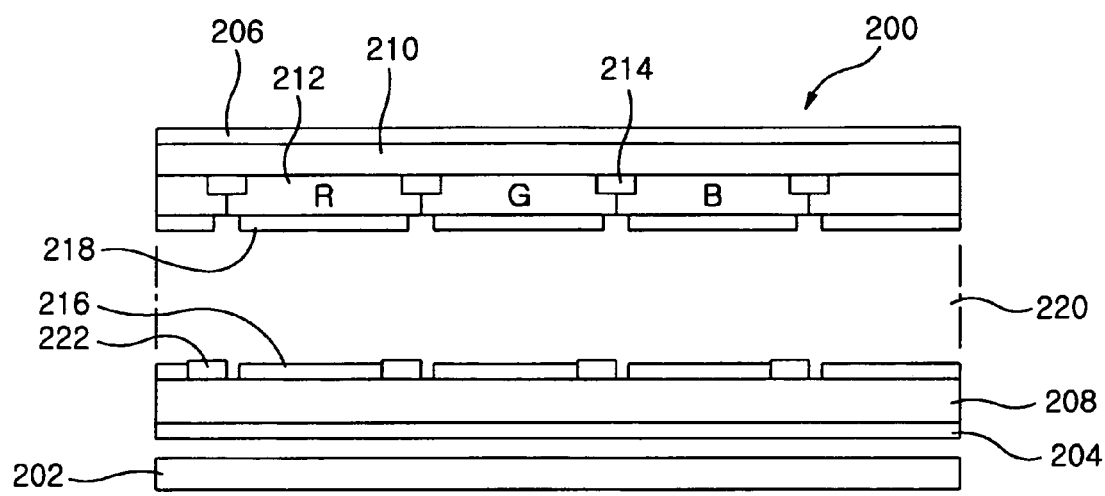
FIG. 3 is a sectional view illustrating an LCD having a backlight unit according to one embodiment of the present invention.

Turning first to FIG. 3, which is a sectional view illustrating an LCD having a BLU according to one embodiment of the present invention. As shown, the LCD includes an LCD panel 200 and a BLU 202. Further, the LCD panel 200 includes a lower polarization film 204, an upper polarization film 206, a lower glass substrate 208, an upper glass substrate 210, a color filter 212, a black matrix 214, a pixel electrode 216, a common electrode 218, a liquid crystal layer 220 and a TFT array 222.

Further, the color filter 212 includes sub-color filters corresponding to red, green and blue light, and the TFT array 222 functions as a switching device to switch the pixel electrode 216 on and off. In addition, the common electrode 218 provides a common voltage to the color filter 212, and the pixel electrode 216 provides certain voltages to the red sub-color filter, the green sub-color filter and the blue sub-color filter.

Also, the pixel electrode 216 and the common electrode 218 change a transmittance of the liquid crystals included in the liquid crystal layer 220 in accordance with applied voltages. That is, the liquid crystals are arranged depending on a voltage difference of the pixel electrode 216 and the common electrode 218. As a result, a light transmitted from the BLU 202 is incident to the color filter 212 through the liquid crystals.

Figure 1:
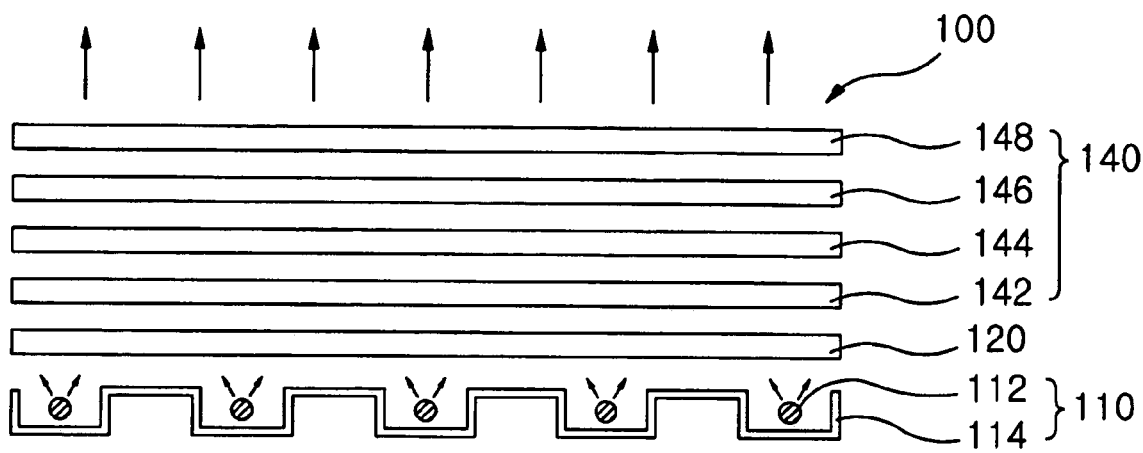
FIG. 1 is a sectional view illustrating a backlight unit included in an LCD.
Figure 2:
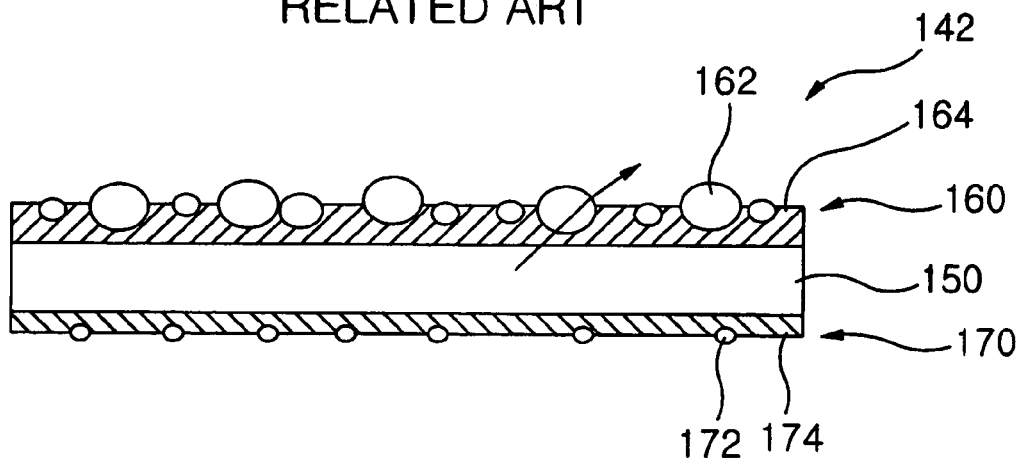
FIG. 2 is a sectional view illustrating a diffuser employed in the backlight unit in FIG. 1.

In addition, as shown in FIG. 1, the BLU 202 is located under the LCD panel 200, and provides a light (e.g. white light) to the LCD panel 200. The BLU 202 may also be an edge-light type BLU where the light source is located at a side of a light guiding plate, or a direct lighting type BLU where the light source is located under the LCD panel.

Figure 4:
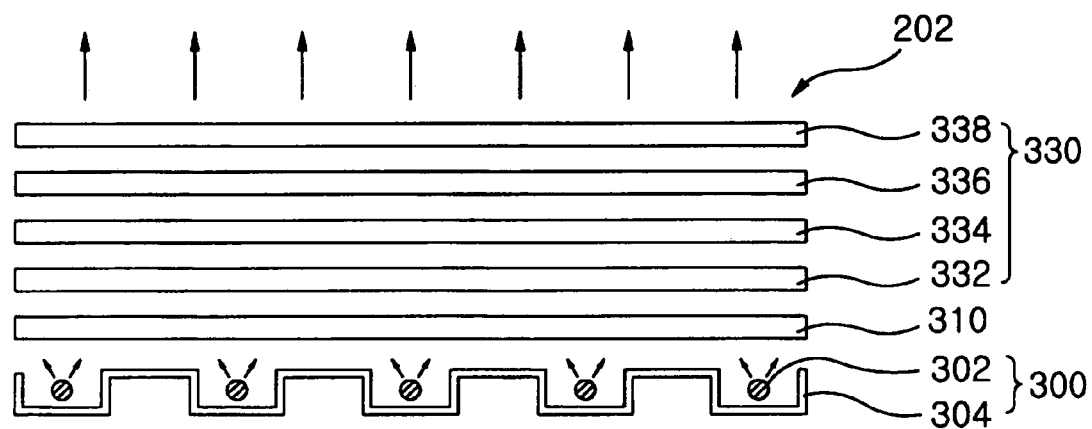
FIG. 4 is a sectional view illustrating a backlight unit according to one embodiment of the present invention.

Turning next to FIG. 4, which is a sectional view illustrating the BLU 202 shown in FIG. 3. As shown in FIG. 4, the BLU 202 includes a light source unit 300, a transparent plate 310 and an optical film 330. Further, the light source unit 300 is located under the transparent plate 310 and includes at least one light source 302 such as a cold cathode fluorescent lamp (CCFL) and a light source reflector 304. However, the light source 302 is not limited to the CCFL.

For example, a point light source such as a light emitting diode (LED), etc. as the light source 302 may be used. Alternatively, a surface light source such as an external electrode fluorescent lamp (EEFL) may be used. Here, when the EEFL is used as the light source 302, the BLU 202 preferably does not include a light guiding plate because the EEFL emits a surface light. In the following description, the light source 302 is assumed to be a CCFL light source. In addition, the CCFL 302 provides a very bright white light, and does not emit heat.

Also, the light source reflector 304 contains and supports the CCFL 302 and reflects a light emitted from the CCFL 302 in a direction of the optical film 330. Here, the light source reflector 304 is made of substance having a high reflectivity and may have a surface coated with silver (Ag).

Further, the transparent plate 310 may not have a predetermined pattern therein, and transmits a light emitted from the CCFL 302. Also, the transparent plate 310 is made of poly methyl meta acrylate (PMMA), poly ethylen terephthalate (PET) or poly carbonate (PC), etc. In addition, as shown in FIG. 4, the optical film 330 includes a diffuser 332, a prism sheet 334 and a reflective polarization film 338. Further, the optical film 330 may optionally include a protection sheet 336.

Figure 5A:
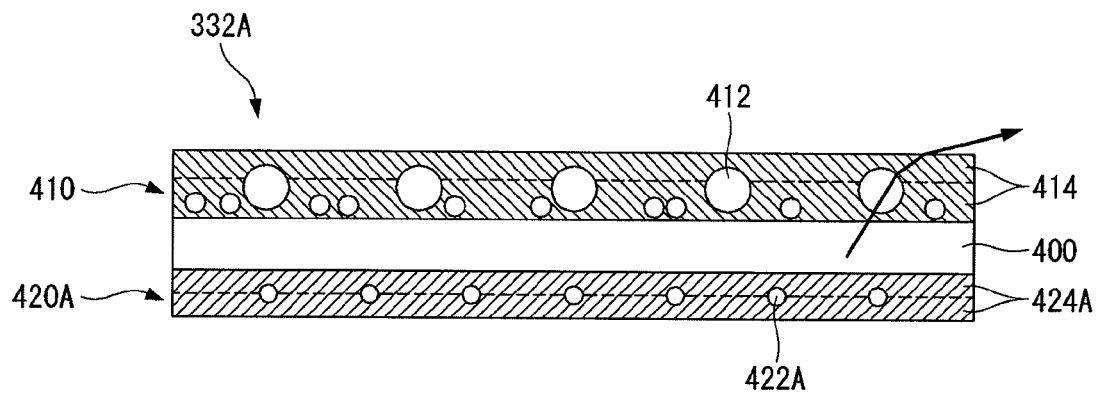
FIGS. 5A and 5B are sectional views illustrating diffusers according to different embodiments of the present invention.

Next, as shown in FIG. 5A, a diffuser 332A according to a first embodiment of the present invention includes a base film 400, a first diffusion layer 410 and a second diffusion layer 420A. The base film 400 is made of acrylate, and does not have a predetermined pattern therein. In addition, the first diffusion layer 410 is formed on an upper surface of the base film 400, and includes a plurality of first diffusion particles 412 (e.g., beads, etc.) and a first resin 414.

As shown in FIG. 5A, the first diffusion particles 412 are contained within the first resin 414 such that the surface of the first diffusion layer 410 is flat. Here, the refractive index (n1) of the first diffusion particles 412 is about 1.4, and the refractive index (n2) of the first resin 414 is about 1.3 to 1.65. However, the refractive index (n2) of the first resin 414 is different from that (n1) of the first diffusion particles 412, i.e. n1≠n2.

In addition, a second diffusion layer 420A is formed on a lower surface of the base film 400, and includes a plurality of second diffusion particles 422A and a second resin 424A. As shown in FIG. 5A, the second diffusion particles 422A are contained in the second resin 424A such that the surface of the second diffusion layer 420A is also flat. The second diffusion particles 422A and the second resin 424A may have the same refractive index as the first diffusion particles 412 and the first resin 414.

Thus, in the above diffuser 332A, the light emitted from the light source unit 300 is incident to the second diffusion layer 420A, and progresses in sequence through the second resin 424A, the second diffusion particles 422A and the second resin 424A in the second diffusion layer 420A. As a result, the light incident to the second diffusion layer 420A is diffused by a certain angle.

Subsequently, the diffused light is incident to the first diffusion layer 410 via the base film 400. Then, the light incident to the first diffusion layer 410 is transmitted to the outside of the first diffusion layer 410 through the first resin 414, the first diffusion particles 412 and the first resin 414.

In other words, the light incident to the first diffusion layer 410 is diffused by the first diffusion particles 412, and then is further diffused by the first resin 414. Accordingly, the haze of the light outputted from the first diffusion layer 410 is enhanced, and so the user does not see the white lines caused by the disposition shape of the light sources 302. Additionally, the viewing angle of the LCD is enhanced.

Figure 5B:
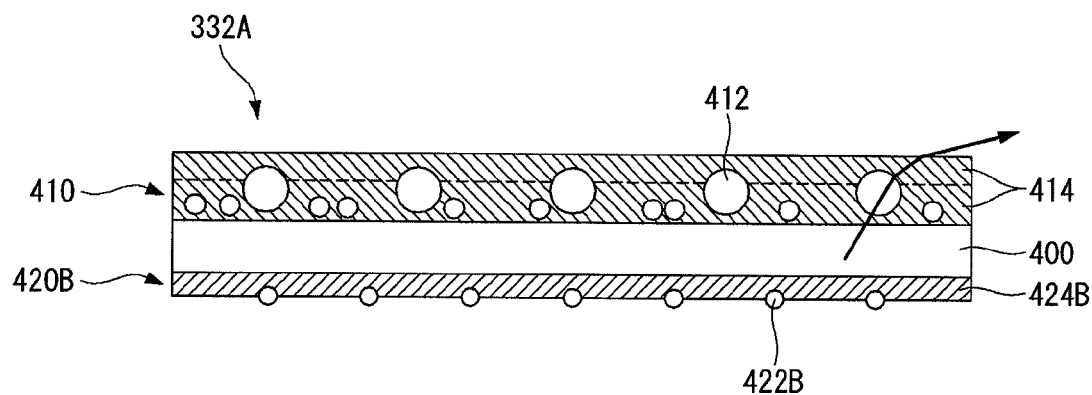

Turning next to FIG. 5B, which illustrates the BLU 202 having a diffuser 332B according to another embodiment of the present invention. As shown, the diffuser 332B includes second diffusion particles 422B projected outside of a second resin 424B. In this instance, because the first diffusion particles 412 are contained within the first resin 414, the diffuser 332B of the present invention has excellent diffusion characteristics compared to the diffuser described in related art.

In addition, with reference back to FIG. 4, the prism sheet 334 condenses the light diffused or condensed by the diffuser 332 in a direction of the protection sheet 336. Further, the protection sheet 336 may optionally be located over the prism sheet 334 to protect the prism sheet 334 from dust, etc., and to increase the viewing angle of the LCD narrowed by the prism sheet 334.

Also, the reflective polarization film 338 reflects some of the light transmitted through the prism sheet 334 or the protection sheet 336 in a direction of the light source unit 300, and transmits the other light to the LCD panel 200. For example, the reflective polarization film 338 transmits aP wave of the light diffused by the protection sheet 336 to the LCD panel 200, and reflects an S wave of the light in a direction of light source unit 300. The S wave reflected by the reflective polarization film 338 is again reflected by the light source reflector 304, and so is changed into a light having aP wave and S wave.

Subsequently, the changed light is again incident to the reflective polarization film 338 through the diffuser 332, the prism sheet 334 and optionally the protection sheet 336. In this instance, theP wave of the incident light is transmitted to the LCD panel 200 (FIG. 3), and the S wave of the incident light is reflected by the reflective polarization film 338 in a direction of the diffuser 332. Then, the reflected light is again reflected by the light source reflector 304, and so the reflected light is changed into a light including aP wave and S wave.

Further, the BLU 202 according to another embodiment of the present invention may include only one of the protection sheet 336 and the reflective polarization film 338. The BLU 202 thus enhances the efficiency of a light by repeating the above process.

In addition, in the BLU 202 according to another embodiment of the present invention, a plurality of diffusers 332 may be substituted for the elements of the optical film 330. In other words, the optical film 330 includes the diffusers 332 instead of the prism sheet 334 and the reflective polarization film 338. In this instance, because the diffusion particles 412 and 422 diffuse or condense the light emitted from the light source unit 300, the BLU 202 transmits a light having a desired brightness to the LCD panel 200.

Hereinafter, experimental results concerning to characteristics of the diffuser 332 will be described in detail with reference to Table 1.

TABLE 1

|  | Illuminance (cd/m2) | Horizontal view angle (°) | Vertical view angle (°) |
| --- | --- | --- | --- |
| Comparative example 1 | 7372 | 52 | 56 |
| Example 1 | 7820 | 52 | 56 |
| Example 2 | 7540 | 51 | 56 |
| Example 3 | 9067 | 40 | 56 |

The comparative example 1 shows an experiment result concerning to the BLU 100 in related art, where the BLU 100 includes the transparent 120, the diffuser 142, the prism sheet 144 and the reflective polarization film 148. In addition, the example 1 shows an experimental result concerning to the BLU 202 according to a first example of the present invention where the BLU 202 includes one diffuser 332, the prism sheet 334 and the reflective polarization film 338. The example 2 shows an experimental result concerning to the BLU 202 according to a second example of the present invention where the BLU 202 includes the transparent plate 310, two diffusers 332, the prism sheet 334 and the reflective polarization film 338. Also, the example 3 shows an experimental result concerning to the BLU 202 according to a third example of the present invention where the BLU 202 includes the transparent plate 310 and three diffusers 332.

In Table 1, the luminance represents an average of light intensity measured at nine points located in front of the BLUs. The horizontal view angle means a viewing angle corresponding to both sides of each of the BLUs, and the vertical view angle represents a viewing angle corresponding to the upper and lower sides of each of the BLUs.

In the experimental results shown in Table 1, the luminance in the examples 1 to 3 is higher than in the comparative example 1 (the luminance in the example 3 is especially highest among the examples). Further, the horizontal viewing angles in the comparative example 1, the example 1 and the example 2 are similar to one another, whereas the viewing angle in the example 3 is smaller than in the other examples. However, this does not affect the characteristics of the BLU corresponding to the example 3. As shown in Table 1, the vertical angles are the same in each example.

Thus, because the BLU 202 of the present invention may use only the diffusers 332 instead of the elements of the optical film 330, the BLU 202 has excellent characteristics compared to the BLU 100 in the related art.

Next, a process of driving the LCD will be described with reference to FIG. 3. In more detail, the BLU 202 provides light to the LCD panel 200. Subsequently, the TFT array 222 switches the pixel electrode 216 on. Then, when a certain voltage is applied to the pixel electrode 216 and the common electrode 218, the liquid crystals included in the liquid crystal layer 220 are arranged depending on the voltage.

Thus, the light provided from the BLU 202 is transmitted through the liquid crystal layer 220 and the color filter 212, and an image is displayed on the LCD panel 200. Here, one red sub-color filter, one green sub-color filter and one blue sub-color filter form one pixel.

Figure 6A:
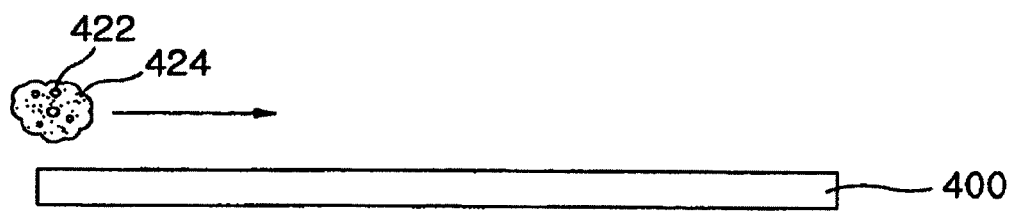
FIGS. 6A to 6H are sectional views illustrating a process of manufacturing the diffuser employed in the back light unit of FIG. 4.
Figure 6B:
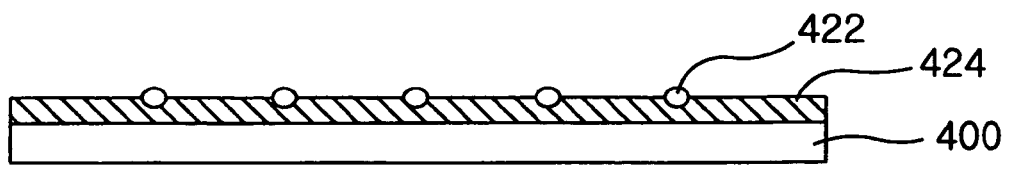

Turning next to FIGS. 6A to 6H, which are sectional views illustrating a process of manufacturing the diffuser 332A of FIG. 5A. As shown in FIG. 6A, a second resin 424 including second diffusion particles 422 is applied on the base film 400. Here, the base film 400 is an acrylate film. Subsequently, as shown in FIG. 6B, the base film 400 on which the second resin 424 is applied is cured by heat.

Figure 6C:
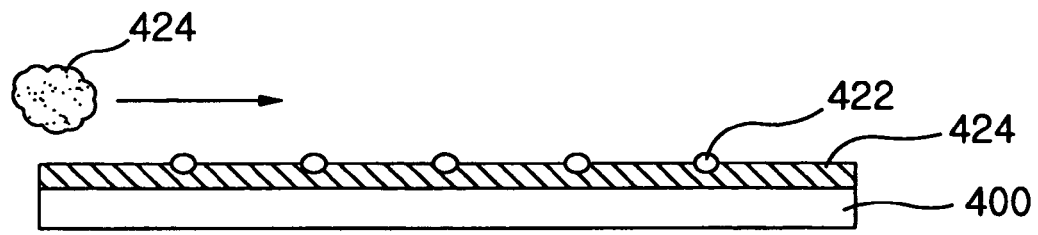
Figure 6D:
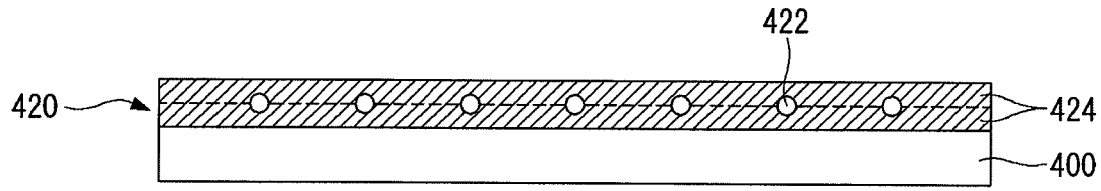
Figure 6E:
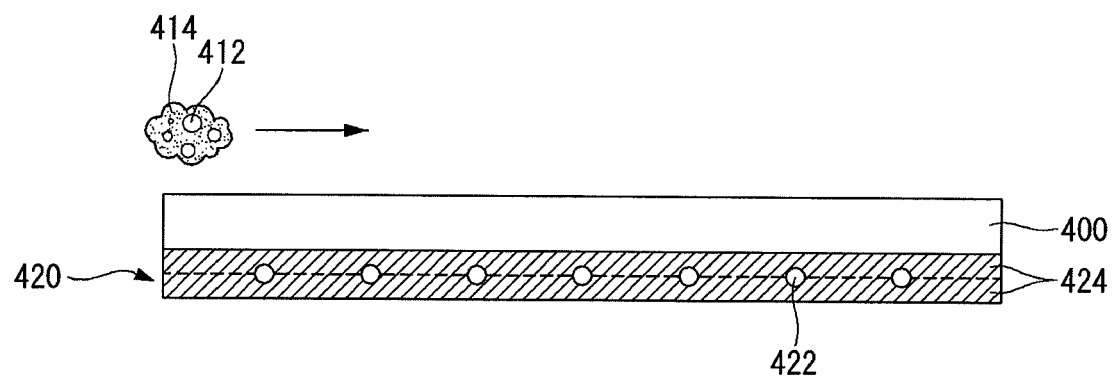

Then, as shown in FIG. 6C, a second resin 424 which does not include the second diffusion particles 422 is applied on the cured base film 400. Subsequently, the applied base film 400 is cured by heat such that the second diffusion layer 420 is formed on the base film 400. Next, as shown in FIG. 6E, the first resin 414 including the first diffusion particles 412 is applied on a surface opposed to the surface corresponding to the second diffusion layer 420.

Figure 6F:
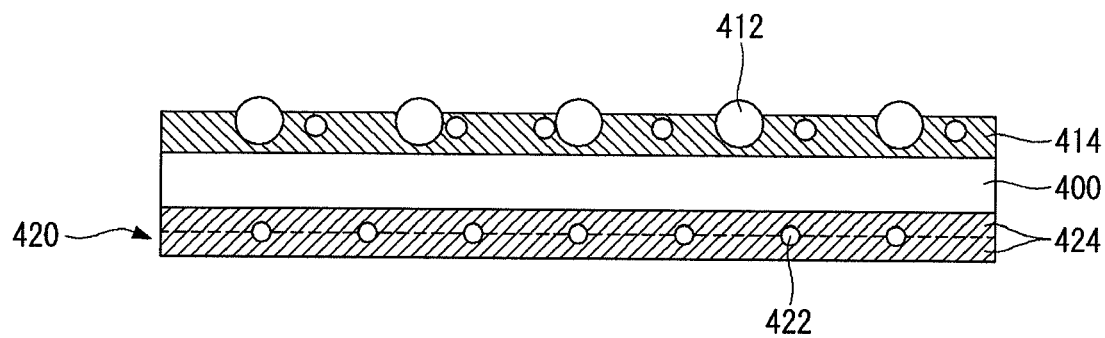
Figure 6G:
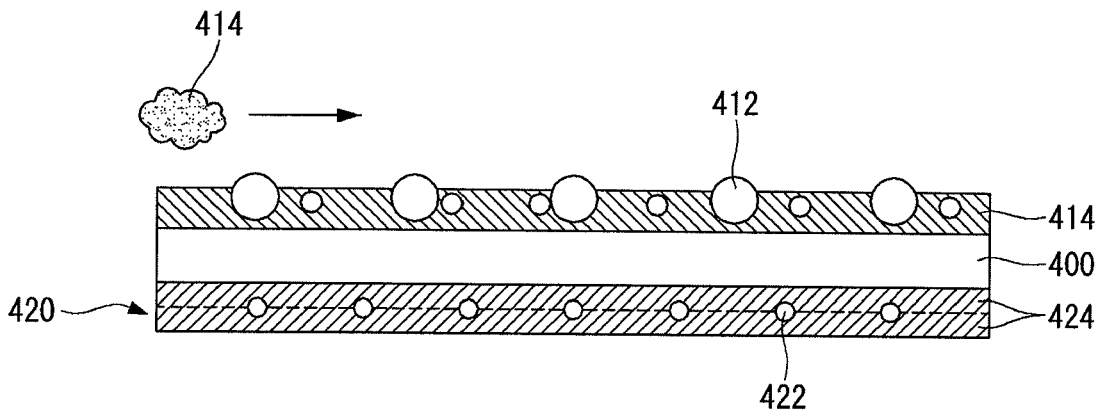
Figure 6H:
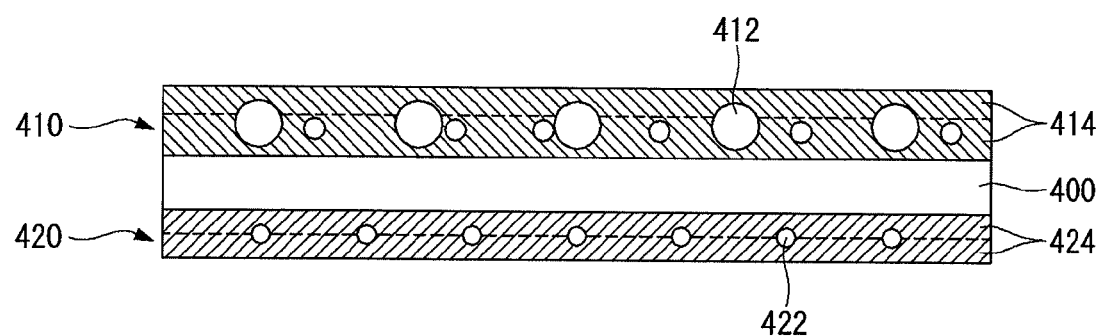

Subsequently, as shown in FIG. 6F, the base film 400 on which the first resin 414 including the first diffusion particles 412 is applied is cured by heat. Then, as shown in FIG. 6G, the first resin 414 which does not include the first diffusion particles 412 is applied on the cured base film 400. Next, as shown in FIG. 6H, the applied base film 400 is cured by heat such that the first diffusion layer 410 is formed on the base film 400.

Further, according to another embodiment of the present invention, the first diffusion layer 410 may be formed on the base film 400 before the second diffusion layer 420 is formed on the base film 400. On the other hand, when the diffusion particles 412 and 422 have a higher specific gravity than the resins 414 and 424, the diffusion particles 412 and 422 are not projected from the outside of the resins 414 and 424.

Accordingly, the first diffusion layer 410 may be formed by applying one time the first resin 414 including the first diffusion particles 412 on the base film 400 and then curing one time the applied base film 400 with heat. Additionally, the second diffusion layer 420 may be formed by applying one time the second resin 424 including the second diffusion particles 422 on the base film 400 and then curing one time the applied base film 400 with heat.

In addition, the diffuser according to the present invention includes diffusion particles having a particular refractive index and a resin, and thus the diffusion characteristics of the diffuser are enhanced and the viewing angle of the liquid crystal display is increased. Moreover, the backlight unit may use a transparent plate without a predetermined pattern. Accordingly, the manufacture cost of the transparent plate is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of manufacturing a diffuser for a backlight unit of a display device, the method comprising:
    applying a first diffusion layer on an upper surface of a base film by forming a first layer including a first resin and a plurality of first diffusion particles on the upper surface of the base film and forming a second layer consisting of the first resin on an upper surface of the first layer to form an upper surface of the first diffusion layer which is substantially flat; and
    applying a second diffusion layer including a second resin and a plurality of second diffusion particles on a lower surface of the base film,
    wherein all of the light that passes through the plurality of first diffusion particles contained in the first diffusion layer subsequently passes through the first resin of the second layer.

2. The method of claim 1, wherein applying the second diffusion layer comprises:
    forming a third layer including the second resin and the plurality of second diffusion particles on the lower surface of the base film; and
    forming a fourth layer including the second resin on a lower surface of the third layer.

3. The method of claim 2, wherein the second diffusion particles are entirely contained in the second resins, such that a surface of the second diffusion layer is substantially flat.

4. The method of claim 1, wherein the first diffusion layer is applied so the first diffusion particles are entirely contained in the first resin such that both surfaces of the first diffusion layer are flat, and wherein the second diffusion layer is applied so the second diffusion particles partially protrude from a bottom surface of the second diffuser layer.

5. The method of claim 1, wherein the first and second diffusion particles have a different refractive index from the first and second resins.

6. The method of claim 5, wherein the refractive index (n1) of the first and second diffusion particles is about 1.4, and the refractive index (n2) of the first and second resins is about 1.3 to 1.65.

7. The method of claim 1, wherein the first diffusion particles or the second diffusion particles have a specific gravity higher than the corresponding first or second resin.

8. The method of claim 1, wherein the backlight unit comprises:
    a light source configured to emit light having a certain wavelength; and
    a transparent plate disposed above the light source and configured to transmit the light emitted from the light source, and wherein the diffuser is disposed above the transparent plate.

9. The method of claim 8, wherein the first diffusion particles are mixed with the first resin to form the first layer, and the plurality of second diffusion particles are mixed with the second resin to form the second diffusion layer.

10. The method of claim 9, wherein the first and second diffusion particles have a different refractive index from the corresponding first and second resins.

11. The method of claim 10, wherein the refractive index (n1) of the first and second diffusion particles is about 1.4, and the refractive index (n2) of the first and second resins is about 1.3 to 1.65.

12. The method of claim 8, wherein the second diffusion layer includes a third layer including the second resin and the plurality of second diffusion particles and a fourth layer including the second resin, such that a surface of the second diffusion layers is flat.

13. The method of claim 8, wherein the first diffusion particles are entirely contained in the first resin such that both surfaces of the first diffusion layer are flat, and wherein the plurality of second diffusion particles partially protrude from a bottom surface of the second diffusion layer.

14. The method of claim 8, wherein at least three diffusers are disposed above the transparent plate.

* * * * *